United States Patent [19]
Burns et al.

[11] Patent Number: 5,485,753
[45] Date of Patent: Jan. 23, 1996

[54] PIEZORESISTIVE SILICON PRESSURE SENSOR IMPLEMENTING LONG DIAPHRAGMS WITH LARGE ASPECT RATIOS

[75] Inventors: David W. Burns, Minneapolis; Max C. Glenn, Shorewood, both of Minn.

[73] Assignee: Honeywell Inc., Minneapolis, Minn.

[21] Appl. No.: 144,096

[22] Filed: Oct. 28, 1993

Related U.S. Application Data

[63] Continuation of Ser. No. 808,263, Dec. 13, 1991, abandoned.

[51] Int. Cl.[6] ............................................. G01L 9/04
[52] U.S. Cl. ..................... 73/720; 73/726; 73/721; 338/42
[58] Field of Search ................. 73/727, 726, 182, 73/720, 721; 338/4, 42; 29/621.1

[56] References Cited

U.S. PATENT DOCUMENTS

| | | | |
|---|---|---|---|
| 4,359,498 | 11/1982 | Mallon et al. | 428/156 |
| 5,029,479 | 7/1991 | Bryan | 73/182 |
| 5,058,435 | 10/1991 | Terry et al. | 73/727 |
| 5,285,690 | 2/1994 | Koen et al. | 73/727 |
| 5,291,788 | 3/1994 | Oohata et al. | 73/727 |

FOREIGN PATENT DOCUMENTS

| | | |
|---|---|---|
| 0500234 | 8/1992 | European Pat. Off. . |
| 4108989 | 9/1991 | Germany . |

OTHER PUBLICATIONS

Burns, "A thesis submitted in partial fulfillment of requirements for the degree of Doctor of Philosophy (Material Science)", 1988.

Primary Examiner—Richard E. Chilcot, Jr.
Assistant Examiner—Joseph L. Felber
Attorney, Agent, or Firm—Paul H. McDowall; Michael B. Atlass

[57] ABSTRACT

A form of pressure sensor diaphragm and method of making that allows for the formation of long rectangular plate structures in semiconducting material, especially Silicon. A plurality or multiplicity of sensors may be constructed on a single chip, thus providing for absolute and relative sensing of pressure on a single device.

15 Claims, 7 Drawing Sheets

PRIOR ART

Fig.5a DEFLECTION

Fig.5b STRESS

DEFLECTIONS

Fig. 5c

STRESS

PIEZORESISTIVE SILICON PRESSURE SENSOR IMPLEMENTING LONG DIAPHRAGMS WITH LARGE ASPECT RATIOS

This application is a continuation of application Ser. No. 07/808,263 filed Dec. 13, 1991, abandoned.

This patent relates to pressure sensor transducers having diaphragms responsive to changes in pressure. The invention is of particular diaphragm formations and processes for producing them. Also described are multi-diaphragm chips with diaphragms for absolute pressure measurements and others for differential pressure measurements on the same substrate.

BACKGROUND OF THE INVENTION

Current devices are able to provide good estimates of "absolute" pressure and good measures of differential pressure, but not at the same place. Currently, two separate pressure sensors are used in these situations. In situations where two sensors could be employed to monitor the pressure of a process, a single absolute pressure sensor combined with a differential pressure sensor at a nearby but different location may yield satisfactory results, but at a substantially higher cost than two sensors at one location. Every fixture associated with a high pressure process must be carefully designed into the process so as not to either disrupt it or cause a leak or loss of pressure. Economic justification for a chip containing both an absolute and differential pressure sensor is therefore quite easy to see where process pressures are about 3,000 psi or greater, where the differential pressure needing to be measured is on the order of 10–15 psi. Of course, the invention herein has wider applicability than simply to measure pressures on the order of 10–15 psi in an absolute pressure range of approximately 3,000 psi, however, the economic justification for use of the invention is well founded in those ranges.

Using polycrystalline silicon long rectangular diaphragms, it has been found that lengthwise piezoresistive elements mounted thereon can produce repeatedly accurate indications of pressures in large (or overpressure) pressure ranges. For example, using a process as described in U.S. Pat. No. 4,592,238 or something similar, a pair of references (Gückel and Burns, DOCTORAL THESIS Micromechanics of Integrated Sensors and the Planar Processed Pressure Transducer, May 1988, and HIGH-STRESS AND OVER-RANGE BEHAVIOR OF SEALED-CAVITY POLYSILICON PRESSURE SENSORS, Chau, et al, IEEE Solid-state Sensor And Actuator Workshop, Jun. 4, 1990) have shown that aspect ratios of 3 to 1 would provide sufficient length for piezoresistive strip elements to generate repeatably measurable signals of appropriate size for such very high pressure conditions. As used herein, the term "aspect radio" refers to length/width ratio of a given diaphragm plate. These papers did not produce long rectangular diaphragm plates with aspect ratios of higher than 4 to 1, such as greater than 10 to 1, although there is speculation that such could be produced.

Because of the way that the piezoresistive sensor strips would be located on the long rectangular plates, the widthwise strain that is induced produces the variation in signal indicative of the amount of pressure being applied to the diaphragm. In the overpressure range, the diaphragm used for sensing differential pressures in the small (differential) range will be substantially flattened out against the overpressure protection stop of the base of the cavity over which the plate or diaphragm is located. It is important that the static (or absolute) sensor response be linear well into the overpressure range of the differential signal. It is useful to have an integral overpressure mechanical stop on the differential sensor to prevent breakage of the differential sensing diaphragm at high pressure. At the same time, under high pressure, the static device should continue to give correct readings. In this way, the differential sensor can give a "high" signal when the differential pressure is, for example, $\leq 15$ psi, and also withstand the condition where the differential pressure is 3,000 psi. It is also important to note that the existence of two sensors (a high pressure static sensor and a low pressure differential sensor) helps in two ways: 1) providing compensation signals for package tube effects, and 2) providing high signal static output for multi-variable sensing.

In the "Gückel" method, polysilicon is low pressure chemical vapor deposited (LPCVD) onto either the post oxide directly, or some intermediate, possibly insulating, layer which overlays the post oxide. The available signal level from piezoresistors on polysilicon is typically a factor of three times less than what is available from single crystal silicon of proper orientation. The polysilicon may then be annealed with a laser to produce what may be a single crystalline structure. Its orientation may not be correct which would cause problems with measuring strain. Alternative methods of melting or annealing the polysilicon could also be used which may or may not alleviate the crystal orientation problem.

In the method described in this patent, wafer bonding is used instead. Therefore, for nearly any aspect ratio, no backfill material or post oxide is required for the construction of the long rectangular diaphragm. The diaphragm is merely laid over the cavity as will be described later.

SUMMARY OF THE INVENTION

This invention shows that a long rectangular diaphragm can be constructed using wafer bonding techniques. It describes how aspect ratios from 3 to 1, 4 to 1, 10 to 1, or even greater, can produce results not found in the prior art. Features including construction of the piezoresistive sensor strips and their orientation, and the use of double overpressure protection are described.

Dual function pressure sensors having a long rectangular plate sensor (or sensors) for measuring absolute pressure accurately and also having a differential pressure sensor in the same chip are described. By using a signal from the absolute pressure sensor, the differential pressure sensor signal can be corrected to yield very highly accurate differential pressure readings in a high pressure environment.

Also described are configurations having a plurality of absolute pressure sensors in a single configuration. Such a configuration can, and in preferred embodiments is, combined with a differential pressure sensor on a single chip.

DETAILED DESCRIPTION OF THE PREFERRED EMBODIMENT

Figure 1:
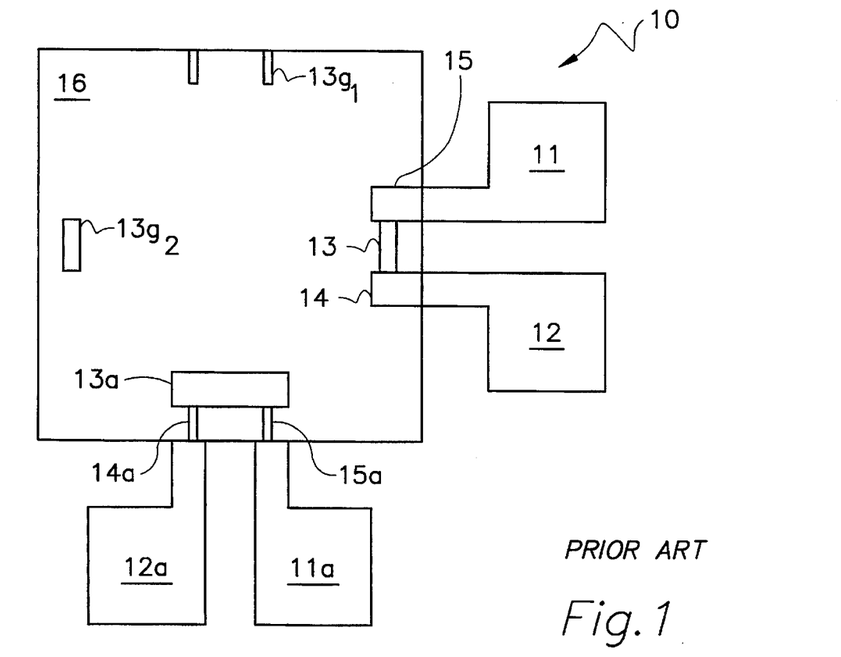
FIG. 1 is a plan view of a known diaphragm design typically found in differential silicon pressure sensors.

FIG. 1 describes a diaphragm plate 16 having a pair of piezoresistive elements 13 and 13a, connected by leadout strips 14 and 15, and 14a and 15a, respectively, to metal bonding pads 11 and 12, and 11a and 12a, also respectively. The way the resistors are mounted in this configuration, provides for substantial signal generation (measured as a change in the voltage for a current running between 11a and 12a, or 11 and 12). One resistor increases in resistance with pressure, the other resistor decreases with the same pressure. Other configurations could be used and the orientation of these resistive sensors yields are typically configured in a Wheatstone bridge for high signal and temperature compensation. That is one reason why they are rotated in orientation with respect to each other. The long rectangular plate diaphragms don't need rotation to derive the appropriate sensing signals, just displacement from each other.

Intuitively, and as is known to those of ordinary skill in the art, the greater the stress on these resistive sensors, the greater the signal produced by them.

Because the thickness of the diaphragm itself is not very great (depends on aspect ratio but typically 25 microns or less), under the strain of great pressure the diaphragm will be compressed against the surface of the cavity towards which it is forced when under pressure. Because of the location of the sensors in the diaphragm arrangement 10, once the diaphragm has flattened out against the bottom of its cavity, no further signal will be generated by sensors 13 and 13a. Ordinarily, the resistive elements 13 and 13a will generate signal in opposite directions for the same stress on a diaphragm. When built as a Wheatstone bridge configuration, there will be another pair of resistive sensor strips on the opposite side of the square diaphragm 16, herein denoted 13g1 and 13g2. This would enable the arrangement of the resistive strips to operate in a Wheatstone bridge configuration as is illustrated in FIG. 6. It is useful to balance the size of the effect of the stress on the resistance by building the resistance strips in appropriate sizes. The longitudinal orientation of the strips is therefore parallel as shown in FIG. 1. Reference should briefly be had to FIG. 5d, to see that the amount of stress in one direction, for example at edges 121 and 122, is substantially different and of an opposite sign from the stress in the perpendicular direction, such as at edges 123 and 124. This problem does not exist in the use of long rectangular diaphragm plates, as will be explained.

Figure 5A:
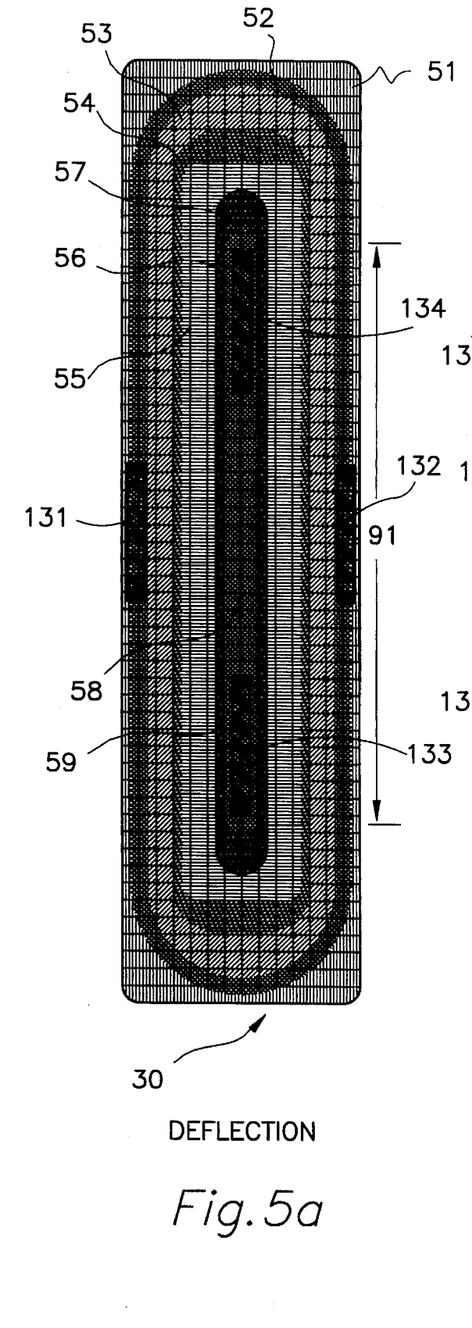
FIGS. 5a–d are ANSYS finite element analysis (FEA) representation plots of deflection and stress. 5a and c show deflection for the rectangular and square diaphragms, respectively, and FIGS. 5b and d show the stress for rectangular and square diaphragms, respectively.
Figure 5B:
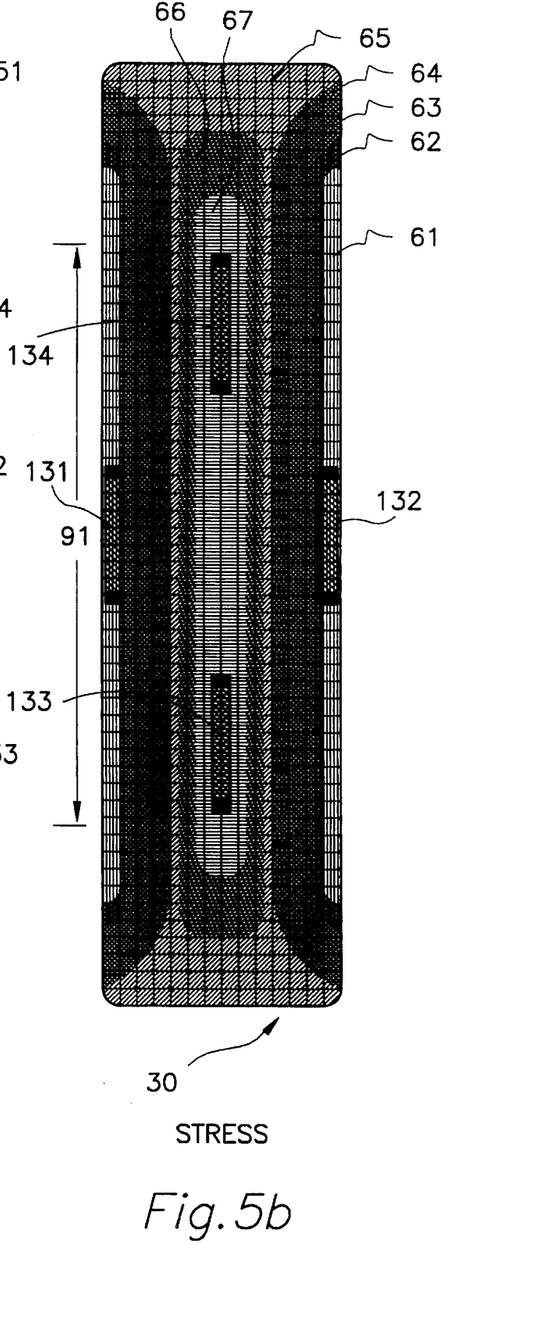

Reference should now be made to FIGS. 5a and 5b which are the FEA representation plots of the long rectangular plates 30 (the ANSYS FEA tool used herein is from Swanson Analysis Systems Inc. of Houston, Pa.) Because of their shape, the deformation continues from the outward edge described at 51, to the center described by the area 59, in a continuous downward slope. The intermediate rings 52–58 show the amount and location of the deformation in FIG. 5a. In FIG. 5b, the areas with different shading indicate differences in stress. The silicon material (100 orientation material, commonly available and well known to those in the art) stresses in two different directions. The highest level of stress in the positive direction (or negative, depending on the orientation of the user) is illustrated by area 61. The amount of stress decreases through areas 62 and 63 until it evens out somewhere between areas 64 and 65. Area 65 is an area of negative stress and the negative stress increases through area 66 and becomes greatest in area 67. Note that both the stress and deflection FEA representation plots are uniform in longitudinal direction throughout area 91. This fact enables us to produce repeatable and easily manufacturable designs for the resistive strips which will produce the change in voltage from which repeatable measurements will be made. The long rectangular plate 30 may be as long as desired, without changing the characteristics of the middle area 91.

Figure 3:
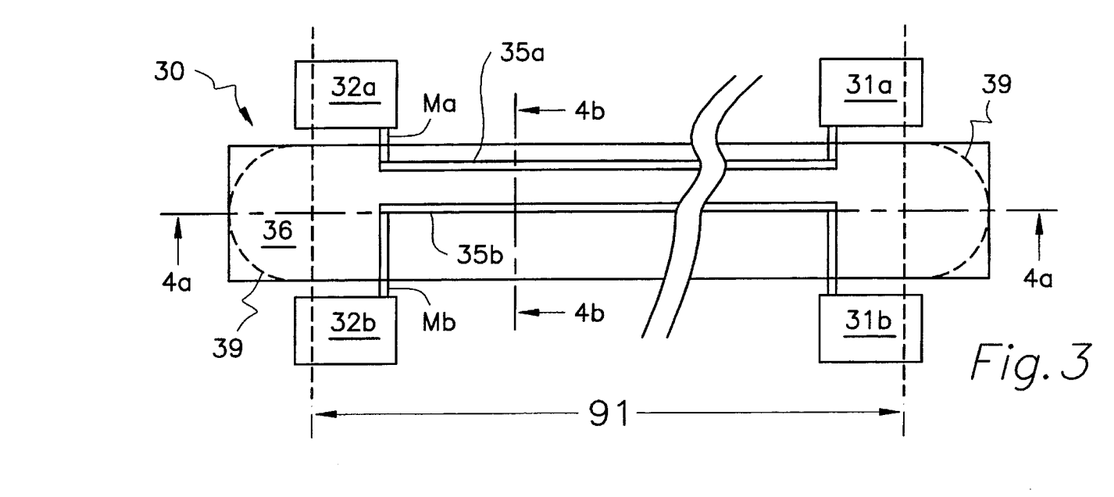
FIG. 3 is a plan view of a long rectangular plate diaphragm having two piezoresistive strips mounted thereon.

Referring now to FIG. 3, a long rectangular plate 36 is described with broken lines indicating that the length may be substantially greater than that shown. The resistive strips 35a and 35b are located in an area of positive and negative stress influence respectively. Strip 35a will be located in an area of high positive stress such as 61 with reference to FIG. 5b, and 35b will be in the area of highest negative stress, such as area 67. The relative lengths or widths of these strips may be balanced because the area of positive stress is an absolute value greater than the negative stress developed in the area of greatest negative stress in a given diaphragm. Bonding pads 32a and 32b and 31a and 31b provide for electrical connection to the resistive strips 35a and 35b. Note the dotted lines 39. These indicate that the edge of the long rectangular plate need not necessarily be square to perform the same function as that of a squared off rectangular diaphragm plate.

Figure 4A:
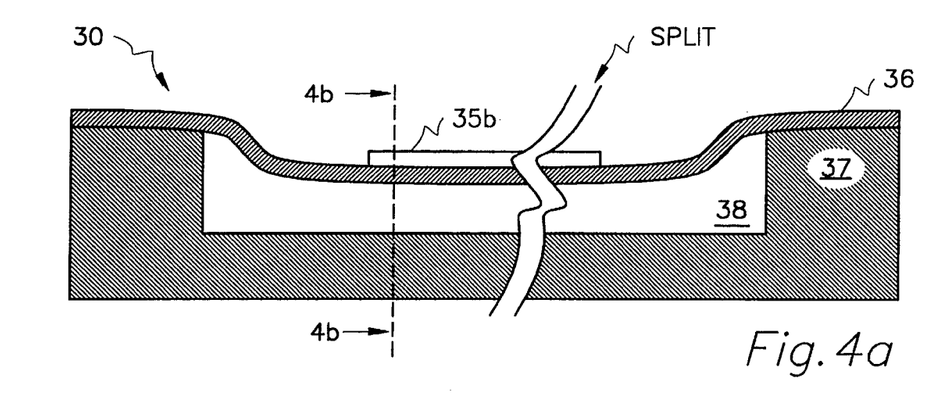
FIGS. 4a and 4b are both sectional views of FIG. 3, taken at lines 4a and 4b respectively.
Figure 4B:
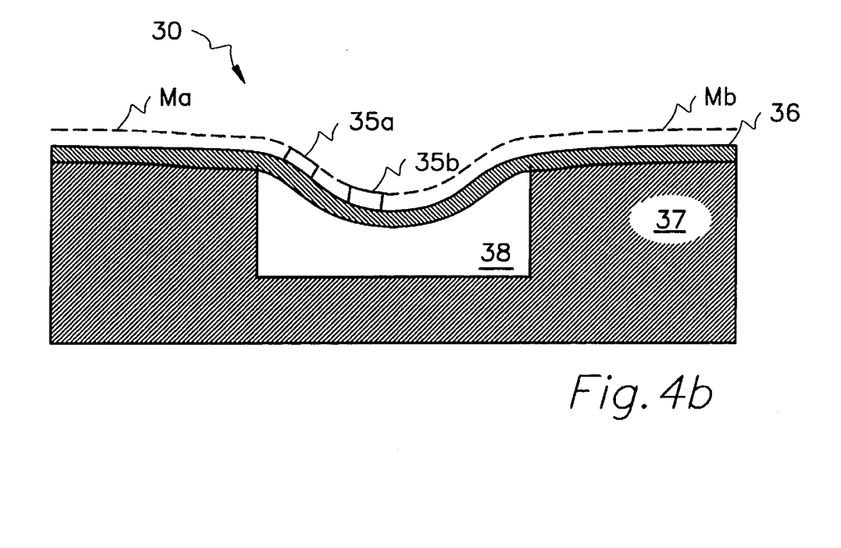

FIG. 4a is a cutaway side view of the same diaphragm as in FIG. 3. However, the FIG. is somewhat more compressed by the split. The diaphragm rests over a cavity 38 in substrate 37. As indicated before, the material 36 is generally a (100) orientation single crystal silicon layer. The resistive strips are oriented in a [110] direction to get the greatest signal from them. Both resistive strips 35a and 35b can be seen in cross section in FIG. 4b. Note that the area 91 defined by the dotted lines in FIG. 3b, is an area similar to that defined by area 91 in FIGS. 5a and 5b in that the stress and deflection regions are uniform in the direction transverse or perpendicular to the longitudinal.

Figure 2:
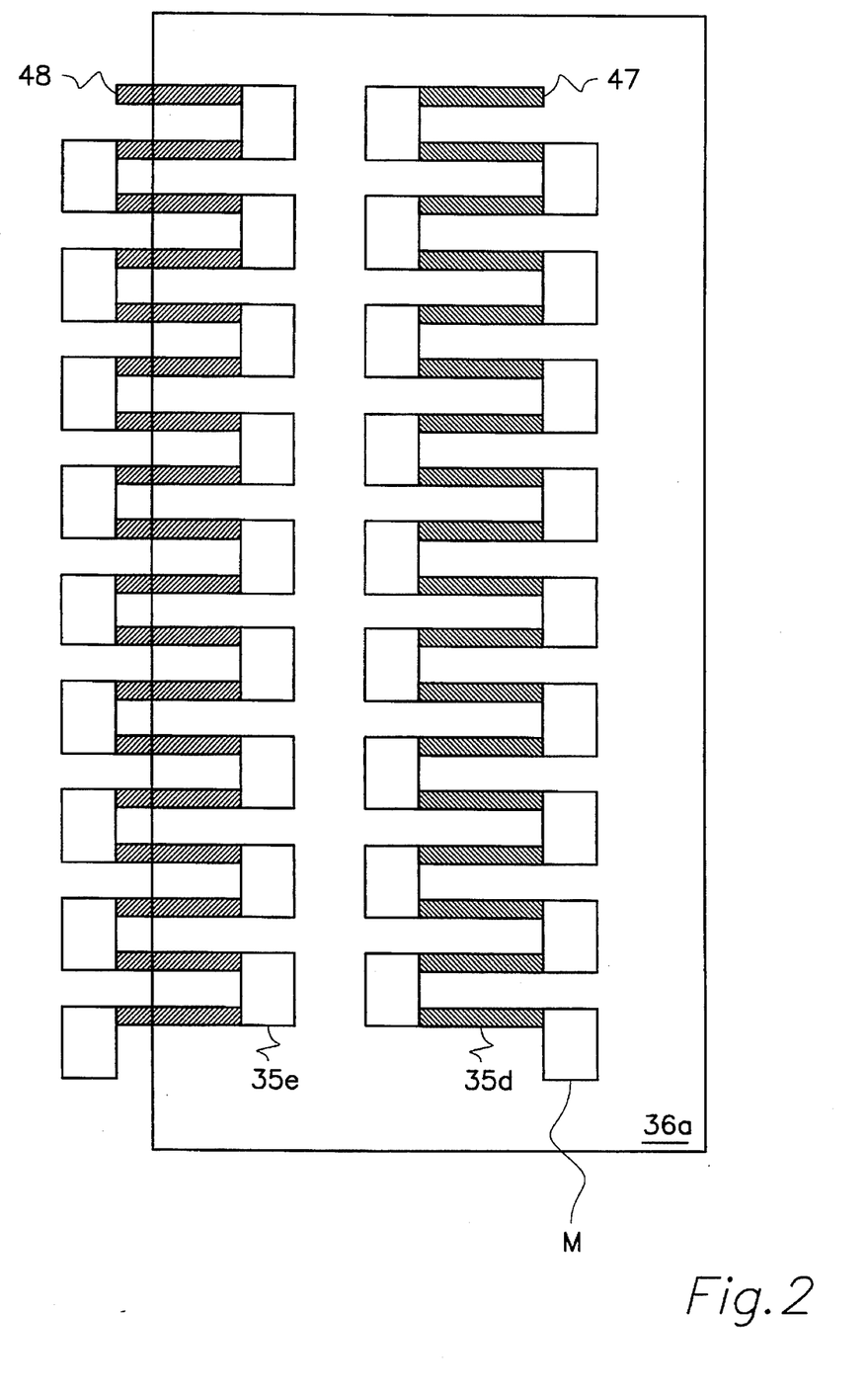
FIG. 2 is a plan view of a long rectangular plate type diaphragm useful for pressure sensors having serpentine piezoresistive strips mounted thereon.

Referring to FIG. 2 in which another long rectangular plate is shown having resistive pathways 47 and 48 in the positive and negative stress regions; these serpentine pathways may be constructed, if desired, rather than using a resistive strip. The shaded areas indicated by arrows 35c and 35d are the resistive strip portions and the other blocks indicated by the arrow M are metallized or implanted connectors.

Figure 7A:
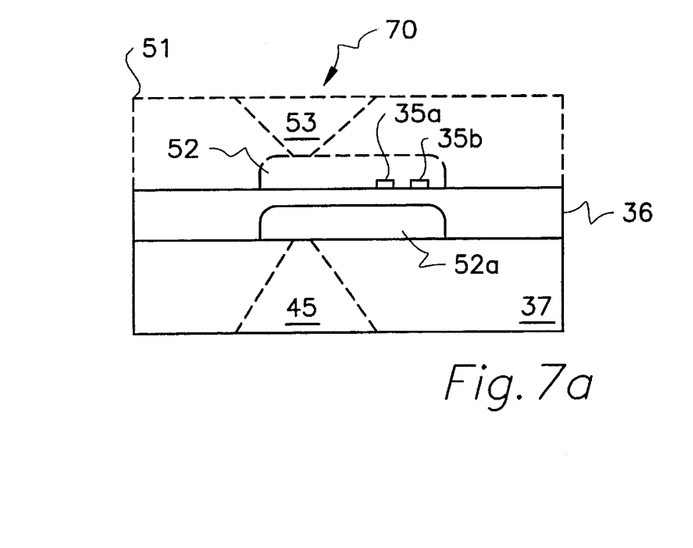
FIG. 7a and FIG. 7b are two side views of alternative structure and construction methods for diaphragm sensors.
Figure 7B:
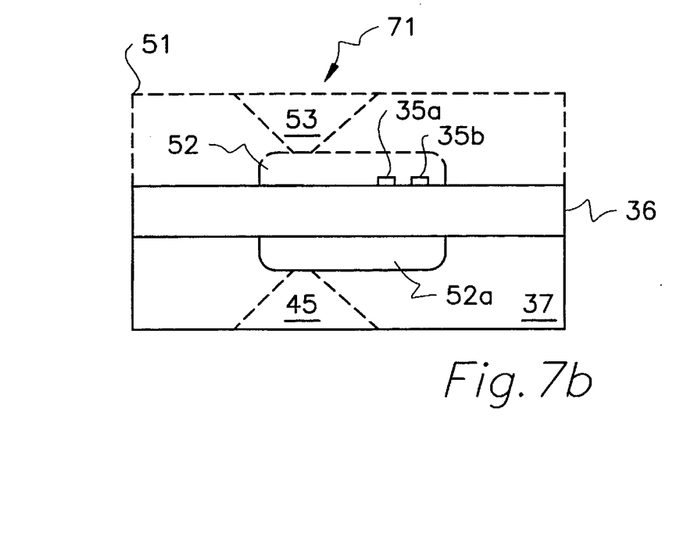

With reference to FIGS. 7a and 7b, an understanding may be had as to how the long rectangular plates may be constructed. In FIG. 7a, a wafer constructed of material 37 is preferably connected to wafer constructed of material 51 and 36, by wafer bonding. This process is illustrated in application Ser. No. 07/652,148, now U.S. Pat. No. 5,295,395 However, it can generally be described as follows: etching a suitable longer than wide straight cavity, 52a having a length to width aspect ratio of greater than 3 to 1 into one surface of a first silicon wafer; epitaxially growing a silicon diaphragm layer of a suitable thickness for use as a diaphragm on an other silicon wafer; bonding the epitaxial layer side of the other wafer to said first silicon wafer; and removing said other silicon wafer from said epitaxially grown silicon diaphragm layer.

Aspect ratios may be anything greater than 4:1, with 10:1 being most preferred at this time.

The original wafer comprising the materials at 51 and 36 will have the cavity 52a patterned and etched into it while the lower surface of material 36 is exposed. Passageway 45 for permitting access to the diaphragm 39 will be etched into wafer 37 after the wafer bonding is complete. Removal of material 51 may be accomplished after the bonding to wafer 37 is completed. When the upper surface of layer 36 is exposed, resistive strips 35a and 35b may be implanted or laid down. If it is desired to have a surface above diaphragm 39 and a cavity 52 thereabove, a second wafer may be bonded over layer 36 with cavity 52 already contained therein. Thus, the completed long rectangular diaphragm assembly 70 is constructed (it should be noted that this view is a cross sectional view and that the longitudinal axis of the diaphragm can be considered to move into and out of the page).

The same can be said about assembly 71 in FIG. 7b. The only difference is that layer 36 need not be patterned and etched. Both FIG. 7a and 7b are used to illustrate the preferred method for constructing the long rectangular diaphragm device. It should also be noted that other methodologies for manufacture may be employed without deviating from the concepts taught herein. It should also be noted that these long rectangular diaphragms may be used as differential pressure sensors in the high pressure range by simply adding access passage 53 to cavity 52 to allow a fluid of interest from the other side to reach layer 36. Various other access passages and combinations will be easily constructed with reference to copending application serial no. 07/652, 148.

Figure 8:
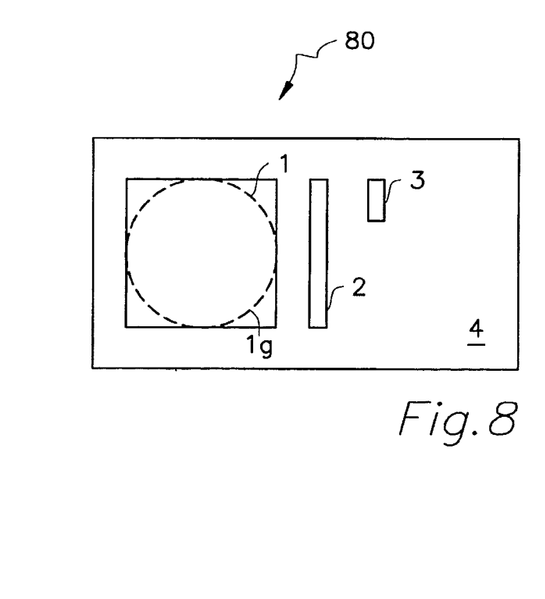
FIG. 8 is a plan view of a hypothetical paired absolute and differential pressure sensors mounted on a single chip having also a third diaphragm mounted thereon.

Refer now to FIG. 8 in which a hypothetical assembly 80 is described having diaphragms 1, 2 and 3 located on the surface 4 thereof. This figure illustrates relative sizes of possible diaphragms. Diaphragm 1g (drawn in dotted lines) shows that the shape of the diaphragm may also vary, including for example, a circular shape as shown. The diaphragm 1 would enable the user of a device such as assembly 80 to sense differential pressure, that is, small changes in pressure before the exceeding of which the diaphragm 1 would reach an overpressure protection stop located along the bottom of the cavity over which said diaphragm 1 is situated. Note that the large diaphragm could also be round or slightly rectangular if desired.

Figure 5C:
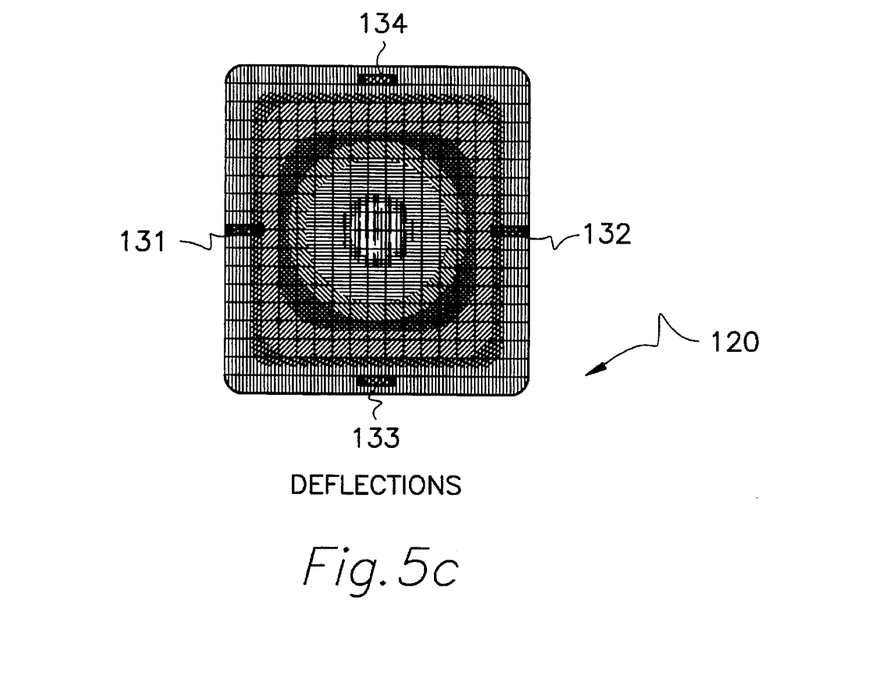
Figure 5D:
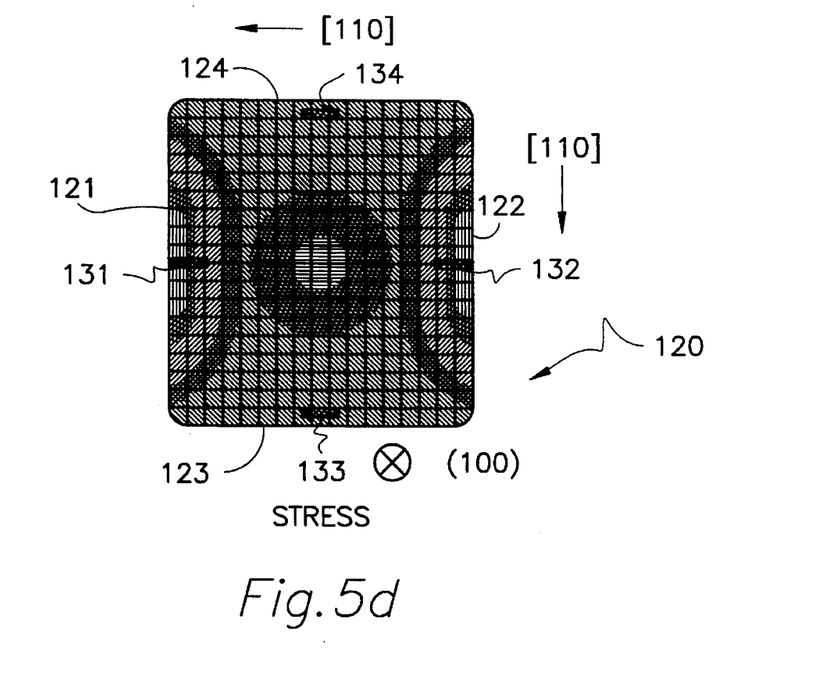
Figure 6:
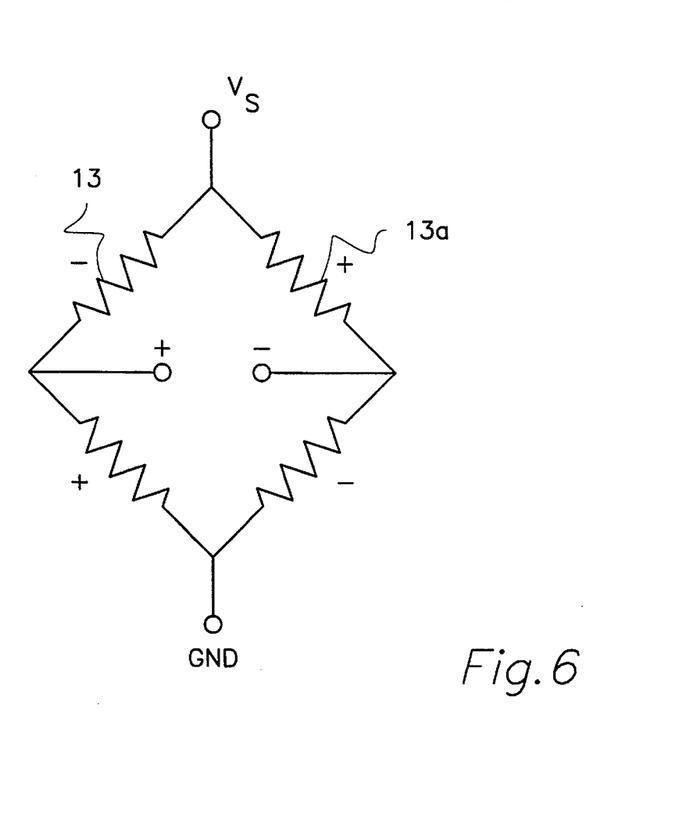
FIG. 6 is an electrical schematic diagram showing a wheatstone bridge configuration.

Refer briefly to FIGS. 5c and 5d in which a square diaphragm 120 FEA representation plot is shown. The positions of the rectangular boxes representing electrically resistive trace material 131-34 which ordinarily would be used for a balanced configuration for such a diaphragm shape are shown visa-vis their stress ($5_d$) and deflection orientation. The preferred orientation of the single crystal silicon is also illustrated on FIG. 5d. FIG. 5a and FIG. 5b similarly show a diaphragm 30 having an aspect ratio greater than about 4:1, as well as the locations of resistors 131–34 disposed thereon with resistor 131 and resistor 132 on the lateral edges thereof and resistor 133 and 134 on the plan and bottom edges of the diaphragm 30 respectively.

Diaphragm 2, which may sense absolute pressure typically in the 3,000 psi range, would be in the nature of a long rectangular plate having two resistive or piezoresistive strips mounted thereon, substantially as illustrated with reference to FIG. 3 above. The diaphragm 3 indicates the size diaphragm which would be capable of measuring the same absolute pressures as the diaphragm 2. Note the difference in size between diaphragms 2 and 3. It is not possible at this date to put piezoresistive strips on diaphragm 3 which will generate the size signal available from the piezoresistive strips on the diaphragm 2.

Figure 9:
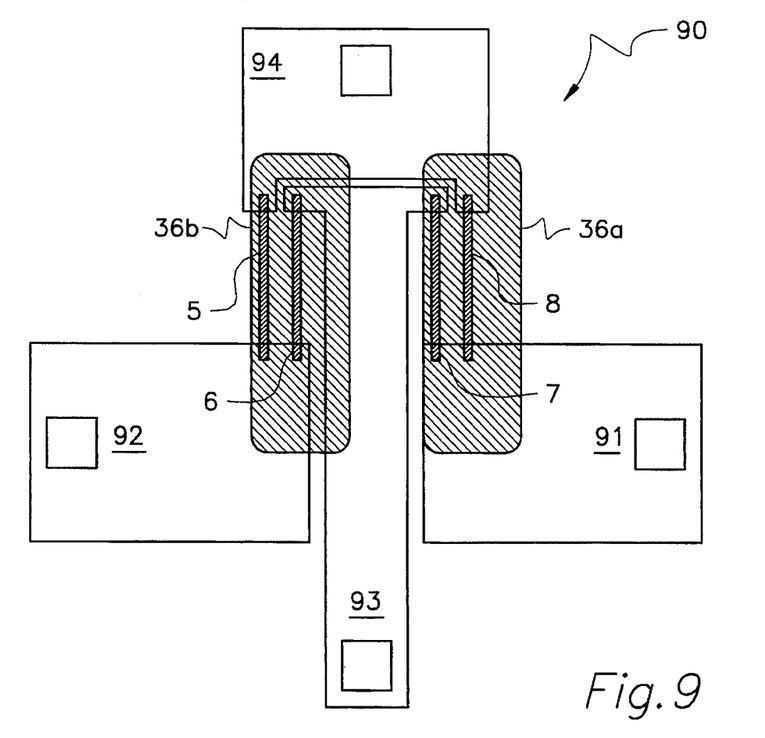
FIG. 9 is a plan view of the layout of a multiple diaphragm high pressure sensor having two long rectangular plate diaphragms.

FIG. 9 illustrates in plan view a layout of a 3,000 psi sensor having two long rectangular plates 36a and 36b. Two strain-sensitive resistors, 5 and 6, and 7 and 8, are mounted on each of the two rectangular plate elements 36b and 36a respectively. The resistors are preferably oriented in the same direction to reduce the effects of thermal and package stress, thermal and mechanical hysteresis, and to improve relative impedance matching between resistors for lower untrimmed offset. By means of contacts 91–94, the resistors are connected in a fully active Wheatstone bridge configuration by low resistance regions referred to as 'leadout' which also allows connection to metal pads for wire bonding. The size of the leadout areas is nominally matched to provide equal parasitic resistances for each arm of the bridge. This will reduce the shift in null with temperature changes.

Figure 10:
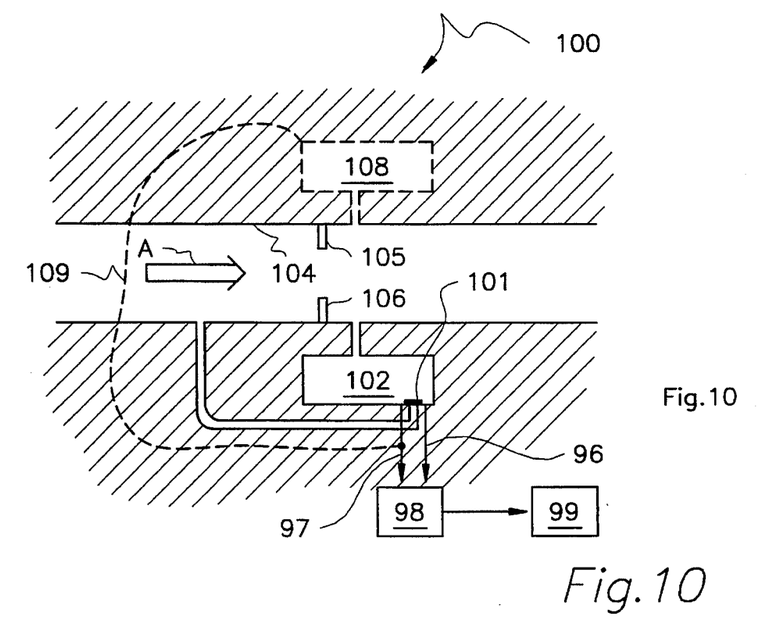
FIG. 10 is a heuristic side view of a high pressure pipe having pressure sensors mounted in association therewith.

In FIG. 10, an assembly 100 is shown having a sensor with the long rectangular plate absolute pressure sensor disposed in chamber 108 and a differential pressure sensor 101 located in a chamber 102 which is in a still section of the flow, as indicated by arrow A, of a fluid under extremely high pressure in high pressure pipe system 104. Baffles 105 and 106 could be provided to prevent the effect of the flow from influencing the pressure readings in area 102. Baffles are used to generate a pressure drop, which is measured with the differential pressure sensor. The pressure can be at several thousand psi.

Signals from the absolute pressure sensor and the differential pressure sensors arrive in processing box 98, along lines 96 and 97, respectively. The signal is then provided in a processed form to a display or interactive display device 99. This display, if interactive, can also be used to control valves or other means which effect the amount of pressure in pipe 104. In the high pressure pipe situation, without the use of this invention (which enables the user to have both an absolute pressure sensor and a differential pressure sensor located on a single chip) it may be desirable to produce a second pressure chamber such as chamber 108, to derive the signal on line 97, only this time coming from line 109. As mentioned earlier this would result in a substantially higher cost structure. Many other applications besides the high pressure pipe situation will come readily to mind upon the availability of this device.

Accordingly, this application is not limited in any way, except as set forth in the following claims.

What is claimed is:

1. A two function pressure sensor disposed on a single sensor chip and having an absolute pressure sensor means for accurately measuring high absolute pressure based on the sensing of the flexing of a plate and also having a differential pressure sensor means sensitive to slight differences in pressure also based on the sensing of the flexing of a plate, each said sensor means having sensing pickoff means associated physically therewith for sensing the flexing of said sensor means plates and wherein the absolute pressure sensor means is a long rectangular plate diaphragm transducer having an aspect ratio of 3 to 1 or greater.

2. A two function pressure sensor as set forth in claim 1 wherein said differential pressure means has substantially greater width than said absolute pressure sensor means.

3. A two function pressure sensor according to claim 1, further comprising:

computational means for applying a compensation formula to a signal generated in response to the sensing pickoff means associated with the differential pressure sensor means, said compensation formula employing an output signal generated by said absolute pressure sensor means; and means for providing a readout of a corrected signal indicating highly accurate differential pressure.

4. A two function pressure sensor system as set forth in claim 3 wherein each sensing pick-off means comprises a leadout configuration of at least two electrically resistive strips and wherein the resistive strips are balanced for parasitic resistance.

5. The pressure sensor configuration apparatus of claim 4 wherein the resistive strips comprise electrically conductive serpentine traces.

6. The pressure sensor configuration apparatus of claim 5 wherein the resistive strips associated with the differential pressure sensor means and the absolute pressure sensor means are oriented parallel to each other on each respective pressure sensor means.

7. The pressure sensor configuration apparatus of claim 6 wherein resistive strips associated with the absolute pressure sensor means comprise a first resistive strip proximate the periphery of a long edge of a long rectangular plate diaphragm and a second resistive strip disposed centered longitudinally on the long rectangular plate diaphragm.

8. The pressure sensor configuration apparatus of claim 7 further comprising a second long rectangular plate diaphragm of similar dimension as the first plate diaphragm and wherein the second long rectangular plate diaphragm has two resistive strips electrically coupled to the first and second resistive strips of the first long rectangular plate diaphragm to provide a fully active Wheatstone bridge configuration.

9. A two function pressure sensor as set forth in claim 7 wherein the absolute pressure sensor means has a leadout configuration of at least two resistive strips balanced for parasitic resistance.

10. The pressure sensor of claim 9 wherein the at least two resistive strips comprise electrically conductive serpentine traces.

11. A multiple pressure sensor apparatus having a multiplicity of long rectangular diaphragm plates at least two of which are arranged so as to have their long edges in parallel and being of substantially the same dimensions as each other and each long rectangular plate having two linear sensing resistors each and being configured to provide a fully active wheatstone bridge configuration.

12. The pressure sensing apparatus of claim 11 wherein the linear sensing resistors comprise serpentine electrical traces.

13. The pressure sensing apparatus of claim 12 wherein a first trace is disposed centered longitudinally on each of the long rectangular diaphragm plates and is electrically coupled to a second trace disposed proximate the periphery of the long edge of each long rectangular diaphragm plate.

14. A pressure responsive apparatus, comprising:

a substrate bearing a cavity in an exterior surface;

a long rectangular diaphragm plate, having an aspect ratio of greater than ten to one, disposed across the cavity and fixed at both ends of the plate to the substrate;

at least two thin traces of electrically conductive resistive material disposed on the plate, so that a first trace is centered on the long axis of the diaphragm plate and a second trace is located proximate a peripheral long edge of the plate;

at least two other thin traces of electrically conductive resistive material disposed on the plate, so that a first of the other thin traces is centered on the long axis of the diaphragm plate and a second of the other thin traces is located proximate a peripheral long edge of the plate;

bonding pads electrically coupled to the traces; and wherein the at least two thin traces and the at least two other thin traces are all oriented on the long rectangular diaphragm plate so that the longitudinal axis of each trace is parallel to the longitudinal axis of each other trace disposed on the long rectangular diaphragm plate.

15. A multifunctional pressure sensing apparatus comprising:

a substrate bearing two closely situated cavities in an exterior surface of the substrate;

two long rectangular diaphragm plates, each having a proximal and distal end, wherein the proximal end of the first plate is fixed to the substrate proximate the first cavity and the first plate is disposed lengthwise across the first cavity so that the distal end is fixed to the substrate opposite the proximal end; and wherein the proximal end of the second plate is fixed to the substrate proximate the second cavity and the second plate is also disposed lengthwise across the second cavity so that the distal end is fixed to the substrate opposite its proximal end so that the first and second plates are oriented parallel to each other; and on each plate a first and a second electrically resistive trace disposed on a longitudinal axis of both the first and second plates, and wherein each first trace is disposed centered longitudinally on the first and second plates and each second trace is disposed proximate a lengthwise periphery of the first and second plates, and wherein the first and second electrically resistive traces associated with the first and second plates are electrically coupled in a fully active Wheatstone bridge configuration.

* * * * *